United States Patent [19]
Takahashi et al.

[11] 3,899,898
[45] Aug. 19, 1975

[54] UNIVERSAL JOINT
[75] Inventors: Koichi Takahashi, Yokohama; Nobuteru Hitomi, Yokosuka; Taisuke Kizu, Fujisawa, all of Japan
[73] Assignee: Nissan Motor Co., Ltd., Yokohama, Japan
[22] Filed: June 21, 1974
[21] Appl. No.: 481,783

[30] Foreign Application Priority Data
June 26, 1973 Japan................................ 48-72093

[52] U.S. Cl........................................... 64/21; 64/8
[51] Int. Cl............................................. F16d 3/30
[58] Field of Search............................... 64/21, 8, 7

[56] References Cited
UNITED STATES PATENTS
| 3,002,364 | 10/1961 | Bellomo | 64/21 |
| 3,133,431 | 5/1964 | Zech | 64/21 |
| 3,553,979 | 1/1971 | Noguchi et al. | 64/21 |
| 3,603,111 | 9/1971 | Aucktor | 64/21 |
| 3,613,397 | 10/1971 | Ohoshi | 64/21 |
| 3,668,893 | 6/1972 | Schmid | 64/21 |

Primary Examiner—Samuel Scott
Assistant Examiner—Randall Heald

[57] ABSTRACT

An outer race has a plurality of annularly and radially uniformly spaced oblique grooves, an inner race has a plurality of annularly and radially uniformly spaced oblique grooves equal in number to the grooves in the outer race, a plurality of power transmitting balls movably engaging the corresponding grooves of the races for transmitting torque from one race to the other, and a ball retaining cage for maintaining the balls in a common plane which bisects the obtuse angle formed by the respective axes of the races. Each of the longitudinal axes of the respective grooves is skewed three-dimensionally relative to the axis of the respective race.

2 Claims, 7 Drawing Figures

UNIVERSAL JOINT

The present invention generally relates to universal joints and more particularly to universal joints of the type in which torque is transmitted at a constant angular velocity at all times from an input shaft to an output shaft through a variable angle by means of power transmitting balls movably engaged in corresponding grooves in the outer and inner members of the joint.

It has already been proposed in a ball universal joint which gives cyclic regularity of transmitted motion, to constrain the balls to roll in grooves in both the outer and inner members, so that when a relative tilt occurs between these two members the plane of the balls is at a median angle of the tilt. In this way, contact is always maintained between the balls and the grooves of the outer and inner members at all angles of tilt, and torque and motion transmission from the input to the output shafts of the joint is smooth and regular. However, in order to maintain this full contact of the balls the grooves are of a longitudinally circular or arc shape so that the balls move, when taking up their median position, in an arc about the theoretical center of the occurring tilt.

In another prior construction of a ball universal joint the outer and inner members have a plurality of longitudinally straight, axially parallel grooves and the balls are located in the corresponding grooves of the outer and inner members. Although this type of a universal joint provides economical machining of the straight grooves, the angular movement of the joint is restricted to a limited range because of the short length of the grooves.

In a still another prior art construction, the outer and inner members have a plurality of uniformly spaced part-helical grooves, the longitudinal axes of the grooves in the outer member intersecting with the axes of the grooves in the inner member. Although this type of construction permits the use of standard machine tools in providing the part-helical grooves in the outer member which is later fixed to a shaft, the separate construction of the two pieces gives rise to a disadvantage in mechanical structure not capable of transmitting a large amount of torque from one member of the joint to the other.

Therefore, an object of the present invention is to provide an improved universal joint which permits the use of standard machine tools while ensuring the mechanical strength of the outer member.

Another object of the invention is to provide an improved universal joint in which the power transmitting balls are maintained precisely on the circumference of the common plane which bisects the obtuse angle formed by the two axes of the joint connected to respective shafts so that torque is transmitted from one shaft to the other.

A further object of the invention is to provide a universal joint which permits the axes of the joint and the respective shafts to be tilted to a greater angle than in prior art universal joints.

Additional objects and advantages of the invention will become apparent from the following description taken in conjunction with the accompanying drawings, in which.

In accordance with the present invention there is provided a universal joint which comprises an outer member having circumferentially uniformly spaced oblique grooves on its inner surface, an inner member having circumferentially uniformly spaced oblique grooves on its outer surface equal in number to the grooves in the outer member, a plurality of power transmitting balls movably engaging the corresponding grooves of the outer and inner members for transmitting torque from one member to the other member, a ball retaining cage maintaining the balls in a first plane which bisects the obtuse angle formed by the axes of the outer and inner members, each of the grooves in the outer member having its axis skewed on a second plane parallel to the axis of the outer member at a first angle relative to the axis of the outer member and further skewed on a third plane normal to the second plane at a second angle relative to the axis of the outer member, and each of the grooves in the inner member having its axis extending in symmetrical relation to the axis of the corresponding grooves in the outer member with respect to the first plane.

Figure 1:
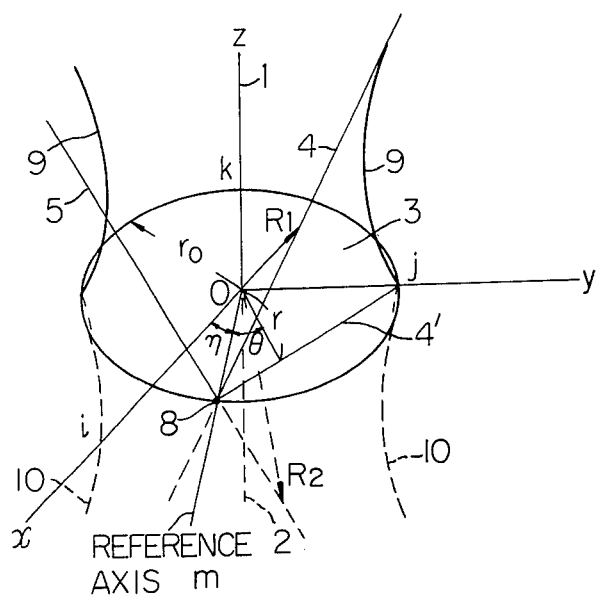
FIG. 1 is a geometrical illustration of the grooves in the outer and inner members of a universal joint of the invention, with the axes of the grooves being tilted in a symmetrical mirror image relationship to each other and describe a pair of hyperboloids as the axes are rotated about the coaxially aligned axes of the joint.
Figure 2:
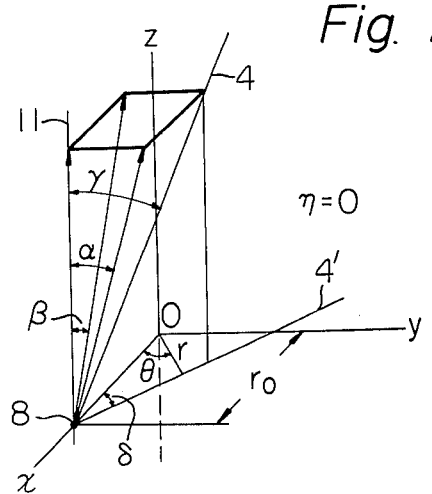
FIG. 2 is a geometrical illustration of one of oblique grooves skewed on perpendicularly intersecting planes with respect to the axis of the joint.
Figure 3:
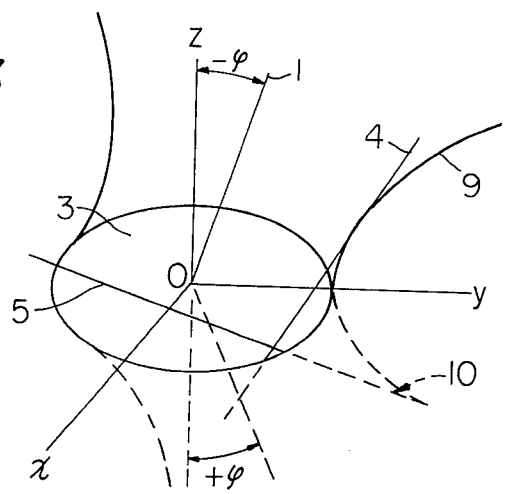
FIG. 3 is a geometrical illustration of the grooves with the loci thereof showing a pair of deformed hyperboloids when the two axes of the joint intersect at a given angle of tilt.

Referring now to the drawings, particularly to FIGS. 1 and 3, wherein the symmetrical relationship of the grooves in respective outer and inner race members is shown. In FIG. 1, numerals 1 and 2 represent the axes of a universal joint in coaxial alignment to a Z axis which intersects the X and Y axes at right angles at point 0. The plane including X and Y axes is a common plane 3 which bisects the obtuse angle formed by the axes 1 and 2. Let us consider a line 4 which is skewed three-dimensionally with respect to the Z axis. A line 5 is drawn in symmetrical relationship to the line 4 with respect to the common bisector plane 3 so that it intersects line 4 at point 8 on the plane 3. A hyperboloid 9 results from rotating the line 4 about the axis 1 and a hyperboloid 10 results from rotating the line 5 about the axis 2 with the common plane 3 bisecting the two hyperboloids. For simplicity, if the point 8 is brought to a point on the X axis, the line 4 extends in a direction skewed at an angle $\alpha$ on a plane parallel to the Y-Z plane relative to a line 11 which is parallel to the Z axis and further skewed at an angle $\beta$ on a plane parallel to the X-Z plane with respect to the line 11 (FIG. 2). The line 4 is therefore skewed by an angle $\gamma$, which is the resultant angle of $\alpha$ and $\beta$, with respect to the line 11.

A line 4' across the common plane 3 is a projected line of the skewed line 4 and makes an angle δ with respect to the X axis. The reference axis "m" on which the lines 4 and 5 intersect at point 8 is skewed at an angle η with respect to the X axis as shown in FIG. 1 and thus a point on the projected line 4a from the origin 0 is represented by the following equation:

$$r = r_o \frac{\cos\theta + \sin\theta \cot(\delta - \eta)}{\tan(\delta - \eta)\sin(\eta + \theta) + \cos(\eta + \theta)} \quad (1)$$

where $r_o$ represents the distance between the point 8 and the origin 0. Therefore, a point on the line 4 has the following vector components:

$$R_1 = r\cos(\eta+\theta)i + r\sin(\eta+\theta)j + r\sin\theta\cot\alpha \cdot k \quad (2)$$

where $i$, $j$, and $k$ are unit vectors on the X, Y and Z axes, respectively.

Since the line 5 is in symmetrical relationship with the line 4, the point on the line 5 can be expressed by the following vector equation:

$$R_2 = r\cos(\eta+\theta)i + r\sin(\eta+\theta)j - r\sin\theta\cot\alpha \cdot k \quad (3)$$

If the two axes 1 and 2 are tilted about the X axis at an angle φ from the Z axis in opposite directions as shown in FIG. 3, the common plane 3 also bisects the obtuse angle formed by the tilted axes 1 and 2, with the lines 4 and 5, being tilted correspondingly. Under the tilt condition, the line 4 can be expressed as follows:

$$R_1' = r\cos(\eta + \theta) i$$
$$+ \{r\sin(\eta + \theta)\cos\phi + r\sin\theta\tan\alpha\sin\phi\}j + \{-r\sin(\eta + \theta)\sin\phi + r\sin\theta\tan\alpha\cos\phi\}k \quad (4)$$

Similarly, the line 5 can be expressed by the following equation:

$$R_2' = r\cos(\eta + \theta) i$$
$$+ \{r\sin(\eta + \theta)\cos\phi + r\sin\theta\tan\alpha\sin\theta\}j - \{-r\sin(\eta + \theta)\sin\phi + r\sin\theta\tan\alpha\cos\phi\}k \quad (5)$$

From the above discussion, it is apparent that the points on the two skewed lines 4 and 5 under the tilt axis condition are symmetrical to each other with respect to the common bisector plane 3. When a power transmitting ball is located with the ball center at the intersecting point of the two skewed lines 4 and 5 on the periphery of the common bisector plane 3 so that the locus of the ball center follows the periphery line, when the two axes 1 and 2 are rotated about the respective axes thereof, it is possible to realize a universal joint.

Figure 4:
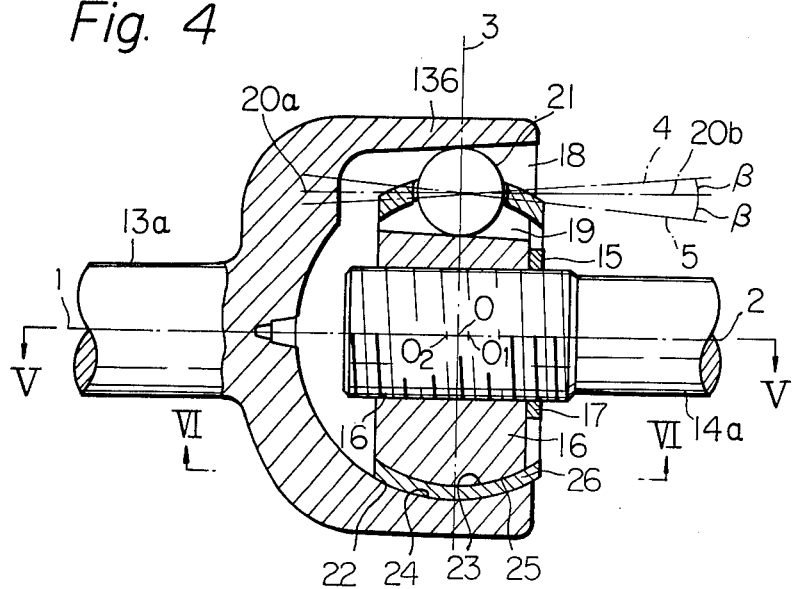
FIG. 4 is a longitudinal view partly in section of the universal joint embodying the principle of the invention shown in FIGS. 1 to 3.
Figure 5:
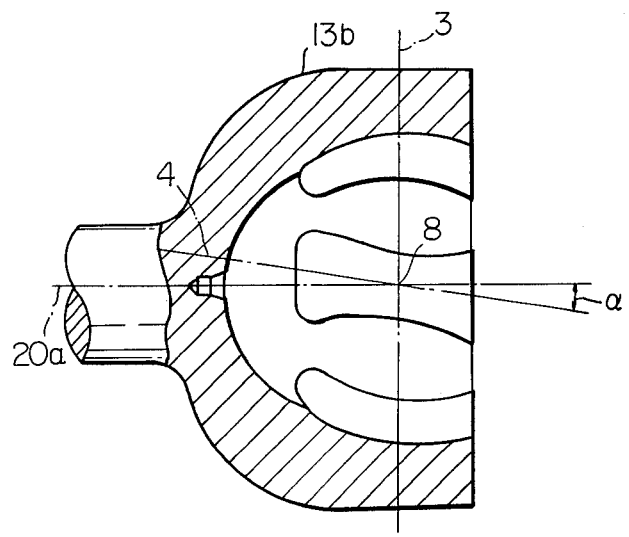
FIG. 5 is a longitudinal section view of the outer member of the joint taken along the line V—V of FIG. 4 with the inner member removed.
Figure 6:
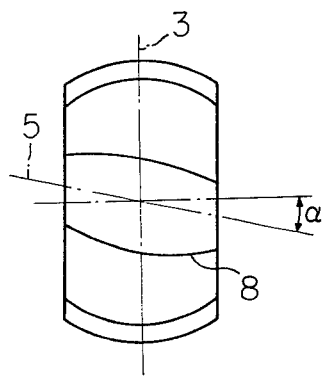
FIG. 6 is an elevational side view of the inner member of the joint viewed from a plane taken along the line VI—VI of FIG. 4.

In FIG. 4, a universal joint embodying the present invention is shown and comprises a shaft 13a with its longitudinal axis in alignment with the axis 1 of FIG. 1, an outer race or member 13b integrally formed with the shaft 13a and having a plurality of annularly and radially uniformly spaced oblique grooves 18 on the inner surface thereof, an inner race or member 14b with a plurality of annularly and radially uniformly spaced oblique grooves 19 on the outer surface thereof equal in number to the oblique grooves 18, a ball retaining cage 26 interposed between the outer and inner races and having spherical inner and outer surfaces, and a plurality of power transmitting balls located in the corresponding grooves in the outer and inner races 13b and 14b. The inner race 14b is coaxially coupled by splines 15 and support rings 16, 17 to a shaft 14a whose axis is in alignment with the axis 2 of FIG. 1. The grooves 18 in the outer race 13b have each of their longitudinal axes aligned with the line 4 of FIG. 1 to make an angle β with a reference line 20a which is parallel to the axis 1 of the shaft 13a. Similarly, the grooves 19 in the inner race 14b have each of their longitudinal axes aligned with the line 5 of FIG. 1 to make an angle β with a reference line 20b which is parallel to the axis 2 of the shaft 14a so that the respective axes of the grooves 18 and 19 intersect at a point which corresponds to the point 8 of FIG. 1 at an angle 2β as illustrated. The ball 21 is located at the intersecting point 8 on the common bisector plane 3 so that it movably engages the corresponding grooves 18 and 19. As shown in FIG. 5, the longitudinal axis of a groove 18 is in alignment with the line 4 of FIG. 1 so that it intersects at the point 8 the common plane 3 at an angle α relative to the reference line 20a. Therefore, it is clear that each of the axes of the grooves 18 is skewed on a plane tangential to the periphery of the common bisector plane 3 at an angle β and further skewed on a plane perpendicular to the tangential plane at an angle α. Each of the axes of the grooves 19 of inner race 14b is also skewed at an angle α relative to the reference line 20b as shown in FIG. 6 so that the axes of the corresponding grooves in the outer and inner races make an angle 2α at the intersecting point 8 on the common bisector plane 3. Therefore, the axes of the corresponding grooves in the outer and inner races are symmetrical to each other with respect to the common bisector plane.

Figure 7:
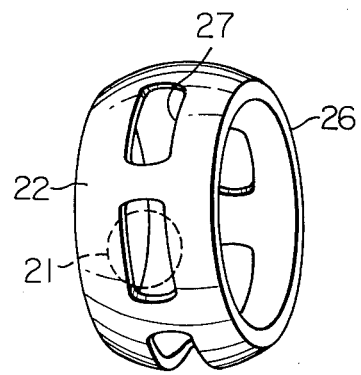
FIG. 7 is a perspective view of a ball retaining cage of the joint of the invention.

FIG. 7 illustrates a ball retaining cage 26 which has a plurality of ball retaining apertures 27 equal in number to the grooves in the outer and inner races. It is to be noted that each of the apertures 27 is elongate circumferentially to allow the ball 21 to move along its edges. The width of the elongate aperture 27 is such that there is no substantial clearance between the elongate edges thereof and the periphery of balls located therein. The spherical outer surface 22 of the cage 26 preferably has its center of pivot at point $0_1$ offset from the point 0 where the axes 1 and 2 intersect so that it slidably engages the similarly shaped inner surface 24 of the outer race 13b. The inner surface 23 of the cage 26 preferably has its center of pivot at point $0_2$ offset from the point 0 so that it slidably engages the similarly shaped outer surface 25 of the inner race 14b, so that the cage 26 has on the outer edge thereof remote from the shaft 13a a greater thickness than on the inner edge thereof adjacent the shaft 13a.

It was ascertained that even at a small resultant angle, e.g. less than 10°, the ball position performance of the joint was fairly good. The angle values of α and β may be determined by the thickness of the cage, the mechanical strength of the outer and inner races and the efficiency of machining.

The grooves 18 and 19 have preferably a crowned cross-section rather than a truly circular cross-section.

Because of the three-dimensionally skewed, intersecting axes of the grooves in the outer and inner races, the ball positioning performance of the joint is assured at all tilt angles of the respective axes of the races.

What is claimed is:

1. A universal joint comprising an outer member having circumferentially uniformly spaced oblique grooves on its inner surface, an inner member disposable within said outer member, having circumferentially uniformly spaced oblique grooves on its outer surface equal in number to the grooves in said outer member, a plurality of power transmitting balls movably engaging the corresponding grooves of said members for transmitting torque from one of said members to the other of said members, a ball retaining cage for maintaining said balls in a first plane which bisects the obtuse angle formed by the axes of said members, said cage being disposable between said inner and outer members, each of the grooves in said outer member having its axis skewed on a second plane parallel to the axis of said outer member at a first angle relative to said axis of said outer member and further skewed on a third plane normal to said second plane at a second angle relative to said axis of said outer member, and each of the grooves in said inner member having its axis extending in symmetrical relationship to the axis of the corresponding grooves in said outer member with respect to said first plane.

2. A universal joint as claimed in claim 1, wherein said ball retaining cage has a plurality of circumferentially elongate apertures having a width substantially equal to the diameter of said power transmitting balls.

* * * * *